Jan. 26, 1954

A. J. RAE

AUTOMATIC MECHANISM FOR PHONOGRAPH RECORD PLAYING APPARATUS 2,667,250

Filed March 6, 1951

2 Sheets-Sheet 1

Inventor
ALEXANDER JAMES RAE
By Ralph E. Atherton
Attorney

Inventor
ALEXANDER JAMES RAE
By Ralph E. Atherton
Attorney

Patented Jan. 26, 1954

2,667,250

UNITED STATES PATENT OFFICE 2,667,250

AUTOMATIC MECHANISM FOR PHONOGRAPH RECORD PLAYING APPARATUS

Alexander James Rae, West Ealing, London, England, assignor to Electric & Musical Industries Limited, Hayes, England, a company of Great Britain Application March 6, 1951, Serial No. 214,051

Claims priority, application Great Britain March 8, 1950

5 Claims. (Cl. 192—33)

This invention relates to automatic control mechanism for phonograph record playing apparatus.

In some forms of automatic control mechanism the automatic cycle is effected under the control of a control disc which after the playing of a record is automatically coupled to the driving motor of the phonograph via a driving member which engages with the periphery of said disc, the latter having a peripheral recess which, after the completion of the automatic cycle is disposed adjacent said driving member so that the control disc is disengaged from said driving member and comes to rest. In order to initiate the automatic cycle it is necessary to impart an impulse to the disc so as to move it angularly and thereby bring the non-recessed part of the control disc into engagement with said driving member. Such angular movement is generally imparted to the disc under the action of the transducer arm as the needle moves in the run-out or eccentric groove of the record, and therefore originates from the lateral pressure between said groove and the needle, and accordingly, there is a tendency for the needle to jump out of the groove and fail to initiate the automatic cycle, and also damage may be caused to the record. This tendency is increased in the case of long playing records having minute record grooves.

The object of the invention is to provide improved control mechanism comprising a control disc which does not require an impulse to be imparted from the transducer arm to the control disc for the initiation of the automatic cycle.

According to the invention there is provided automatic mechanism for a phonograph record playing apparatus comprising a control disc which requires it to be driven to effect the automatic cycle, a clutch comprising a driven element coupled with said disc and a driving element coupled with said motor, means for causing said driving element to engage said driven element when an automatic cycle is to be effected and a cam operated by said disc for moving said driving element out of engagement with said driven element when the automatic cycle has been effected, wherein in order to prevent said cam from obstructing a subsequent movement of said driving element into engagement with said driven element means are provided whereby after the disengagement of said driving element from said driven element said control disc is further driven until said cam has moved from its obstructing position.

In order that the said invention may be clearly understood and readily carried into effect, an embodiment thereof will now be described by way of example with reference to the accompanying drawings, in which—

Figure 1:
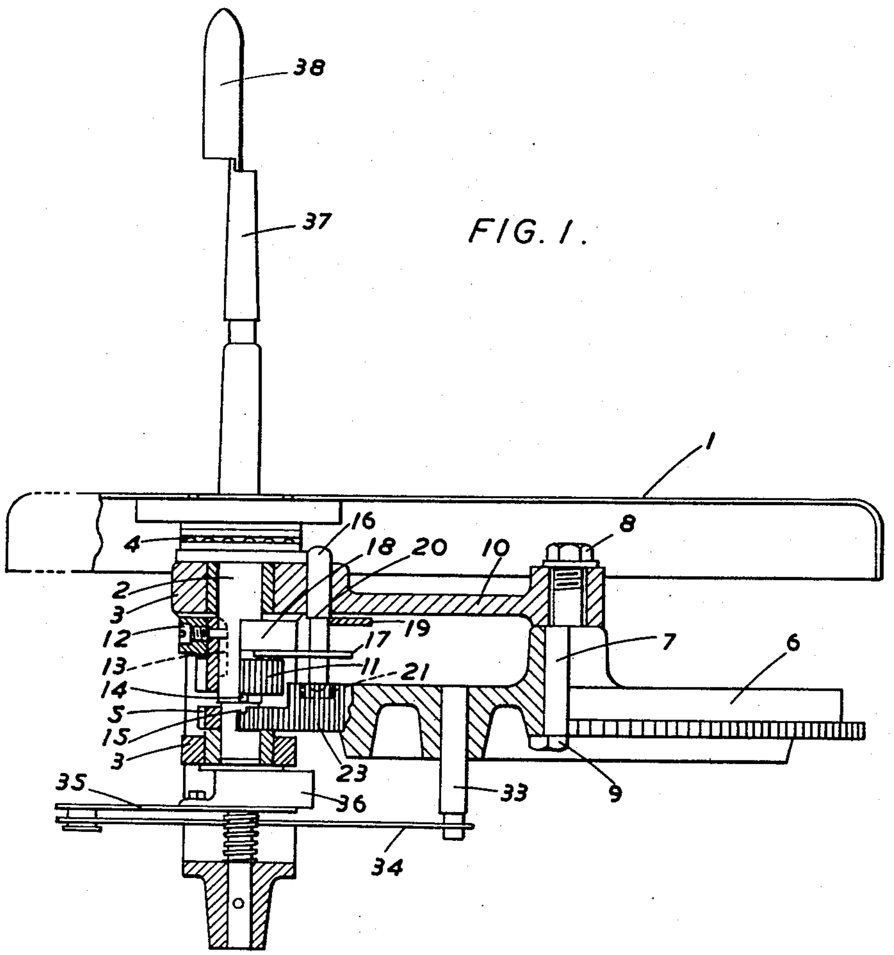
Figure 2:
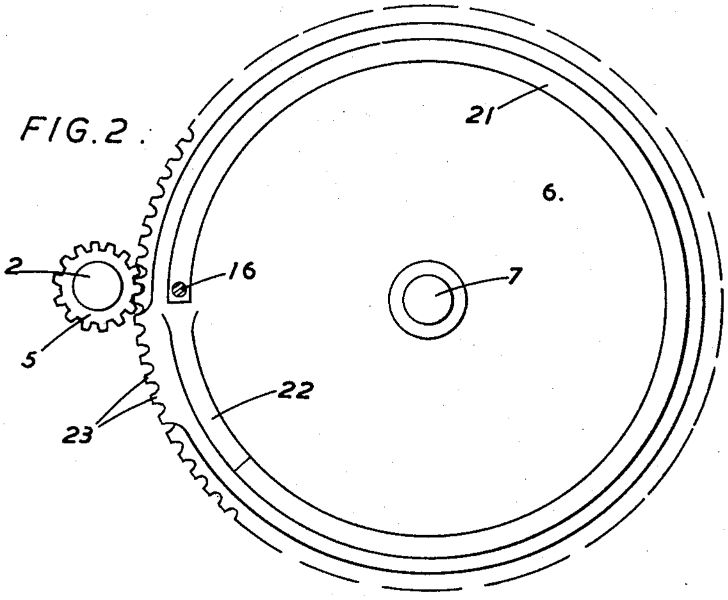
Figure 3:
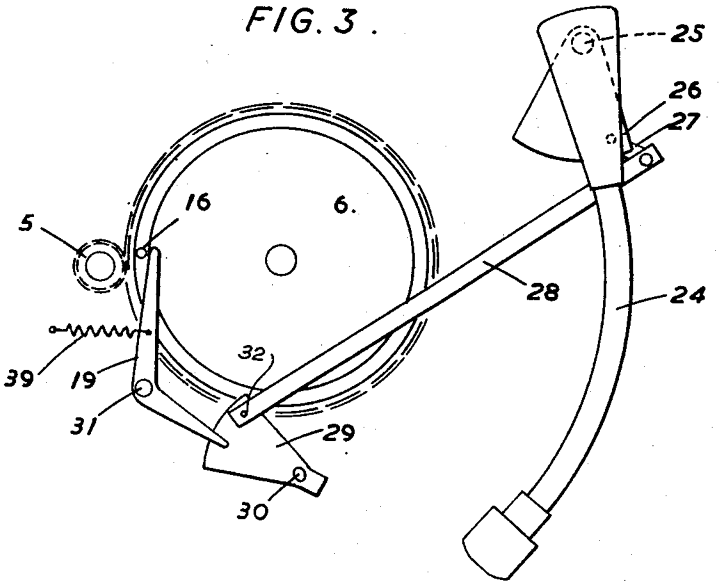

Figure 1 is a part-sectional elevation of part of a phonograph embodying the invention, Figure 2 is a plan view of the control disc and a driving gear wheel, and Figure 3 is a plan view showing the connection between the pick-up and a trip lever.

Referring to the drawings the phonograph shown comprises a turntable 1 mounted on a shaft 2 which projects through a bracket 3, bearings 4 being provided between the turntable 1 and the bracket 3. A driven element formed by a gear wheel 5 loosely mounted on the shaft 2 is arranged to be in continuous engagement with the toothed periphery of a control disc 6 rotatably mounted on a shaft 7 secured by bolts 8 and 9 to a projecting arm 10 of the bracket 3. The turntable 1 is arranged to be driven by an electric motor (not shown) which for example drives a pulley engaging the rim of the turntable. A driving element is formed by a further gear wheel 11 mounted on the shaft 2 above the gear wheel 5, the gear wheel 11 being movable longitudinally, that is to say vertically, on the shaft 2 but being non-rotatable with respect to the shaft 2 by virtue of a grub screw 12 which is secured into the gear wheel 11 and projects into a vertical key-way 13 in the shaft 2. The opposed faces of said gear wheels 5 and 11 are formed with teeth 14 and recesses 15 respectively so that the gear wheels form a dog clutch. In order to lift the upper gear wheel 11 at appropriate times a plunger 16 is provided which is movable vertically in the arm 10 of bracket 3 said plunger 16 being provided with a plate 17 which projects beneath a flange 18 on the upper end of the upper gear wheel 11, so that when the plunger 16 is raised the plate 17 lifts the upper gear wheel 11 out of engagement with the lower gear wheel 5. In the raised position of the plunger a trip lever 19 projects under a shoulder 20 on the plunger 16 as shown in Figure 1 and prevents the plunger 16 from dropping until the trip lever 19 is moved from beneath shoulder 20 at the end of the playing of a record as will be hereinafter described. With the plunger 16 in its raised position, therefore, there is no driving connection between the phonograph driving motor and the control disc 6, since the turntable 1 is not coupled to the disc 6 via the above-mentioned dog clutch. However, when the trip lever 19 is moved from beneath shoulder 20 after the playing of a record the plunger 16 drops until its lower end engages the bottom of an annular groove 21 in the upper surface of the control disc 6, the lowering of the plate 17 enabling the upper gear wheel 11 to drop into engagement with the lower gear wheel 5 under the action of gravity. A driving connection is thereby established between the phonograph driving motor and the control disc 6, and the latter accordingly rotates so as to effect the various operations of the automatic cycle such as the lifting of the transducer arm from the record, the feeding of a further record to the turntable and the lowering of the transducer arm so that the needle engages the periphery or first groove of the further record. When the control disc 6 has rotated sufficiently far for the automatic cycle to be completed, a cam formed by a ramp 22 in the groove 21 causes the plunger 16 to rise until the trip lever 19 again engages beneath the shoulder on the plunger 16 under the action of a spring 39 (Figure 3). As the plunger 16 rises the plate 17 thereon lifts the upper gear wheel 11, by engaging with the flange 18 on the upper gear wheel 11 so that the dog clutch becomes disengaged.

If the control disc 6 were to come to rest at this time, with the ramp 22 still beneath the plunger 16, the latter would not be able to drop again upon a further operation of the lever 19 after the playing of a further record, and a further automatic cycle could not be initiated. It is therefore necessary for the control disc 6 to be rotated through a further angle sufficient for the ramp 22 to move from under the plunger 16. For this purpose the control disc 6 is provided over a suitable peripheral portion with teeth 23 of greater height than those on the remaining portion of the periphery, said teeth 23 engaging with the upper gear wheel 11 as the ramp 22 commences to lift the plunger 16, and remaining in engagement therewith after the upper gear wheel 11 has been moved to its raised position so as to maintain a driving connection for a further period between the driving motor and the control disc 6. The control disc 6 accordingly continues to be rotated, after the dog clutch has been disengaged as above-described, until the ramp 22 moves from under the plunger, at which time also the peripheral portion of the control disc provided with the teeth 23 moves away from the upper gear wheel 11 so that the control disc is no longer driven and comes to rest.

The manner in which the trip lever 19 is operated at appropriate times under the control of the pick-up arm is shown in Figure 3. The pick-up arm 24 is mounted on an angularly movable shaft 25 on which is mounted an arm 26 connected by a link 27 to a bar 28 pivotally connected to an arm 29 which is angularly movable about a vertical pivot 30. The trip lever 19 is formed as a bell crank lever and is pivotally mounted at 31, the said spring 39 urging one arm of the trip lever towards the plunger 16. The other arm of said trip lever projects into the path of a pin 32 on bar 28 so that when the pick-up moves inwardly to an appropriate extent after the playing of a record the pin 32 engages the trip lever and moves it away from plunger 16. When the pick-up is swung outwardly by the automatic mechanism the trip lever 19 is again moved towards the plunger 16 by the spring 39.

It will be seen that the energy required for initiating the automatic cycle is solely that required to cause the dog clutch to engage and is considerably less than in mechanism in which the control disc requires to be moved angularly to establish a driving connection with the motor. In the particular arrangements above described it is merely necessary to operate the trip lever 19 to cause the dog clutch to engage, the downward movement of the upper gear wheel 11 being thereupon effected under the action of gravity.

The control disc 6 carries a pin 33 which is connected by a link 34 to an arm 35 projecting from an angularly movable member 36, so that as the control disc 6 rotates the member 36 is moved angularly and as described in British Patent No. 617,864 a sleeve 37 is moved angularly to remove a record from an offset portion 38 of the record post.

What I claim is:

1. Automatic mechanism for phonograph record playing apparatus comprising a control disc, means for driving said disc, a clutch including a driven element coupled to said disc, a driving element coupled to said driving means, means for engaging said driving element with said driven element to drive said disc to initiate an automatic cycle, means operated from said disc to move said driving element out of engagement with said driven element after a predetermined angular movement of said control disc, and means for coupling said driving element with the disc to drive the disc for a limited extent beyond said predetermined angular movement.

2. Automatic mechanism for phonograph record playing apparatus comprising a control disc, means for driving said control disc through one revolution to effect an automatic cycle, a clutch comprising a driving element coupled to said driving means and a driven element coupled to said control disc, control means for engaging said clutch elements to couple said control disc to said driving means, and means operated from said control disc for disengaging said clutch elements when said control disc has moved through a substantial part of one revolution, said disc having a coupling surface engaged by said driving element during said part of a revolution and a further coupling surface having an angular extent substantially less than that corresponding to one revolution of said disc and disposed to be engaged by said driving element when said clutch is disengaged to drive said control disc to a limited extent until said further coupling surface becomes disengaged from said driving element.

3. Automatic mechanism for phonograph record playing apparatus comprising a control disc, means for driving said disc, a clutch including a driven element coupled to said disc, a driving element coupled to said driving means, said disc having a coupling surface for engagement by said driven element, said disc having a further coupling surface of smaller angular extent than said first-mentioned coupling surface with which said driving element can engage, means for moving said driving element into engagement with said driven element to rotate said control disc through a substantial part of a revolution, and means for disengaging said driving element from said driven element at a position when said further coupling surface can be engaged by said driving element thereby to drive said control disc for a limited angular extent until said further coupling surface is moved out of engagement with said driving element.

4. Automatic mechanism for phonograph record playing apparatus comprising a control disc, means for rotating said disc, a clutch including a driven element coupled to said disc and a driving element coupled to said driving means, a cam rotatable with said control disc, and a cam follower connected to said driving element to control engagement and disengagement of said driving and driven elements, said control disc having a surface to drive said control disc for a substantial degree by said driven element and a further surface for engagement by said driving element to drive said control disc to a limited extent when said driving and driven elements are disengaged and said driven element is disengaged from said first-mentioned surface.

5. Automatic mechanism for phonograph record playing apparatus comprising a control disc having gear teeth on a periphery thereof, means for rotating said disc, a clutch including a driven element in the form of a gear wheel engaging said teeth and a driving element in the form of a gear wheel coupled to said driving means, a cam rotatable with said control disc, a cam follower engaging said cam and connected to said driving element, and further gear teeth on said control disc, said further gear teeth being disposed to be engaged by said driving element when said driving and driven elements are disengaged to drive said control disc for a limited extent after said driven element is disengaged from said first-mentioned gear teeth.

ALEXANDER JAMES RAE.

References Cited in the file of this patent

UNITED STATES PATENTS

| Number | Name | Date |
|---|---|---|
| 1,145,793 | Preuss | July 6, 1915 |
| 1,532,116 | Batchelder | Apr. 7, 1925 |
| 1,942,158 | Winchell | Jan. 2, 1934 |
| 2,069,595 | Thomas | Feb. 2, 1937 |
| 2,142,257 | Sarta | Jan. 3, 1939 |
| 2,214,482 | Schmidt | Sept. 10, 1940 |
| 2,432,483 | Miller et al. | Dec. 9, 1947 |
| 2,442,574 | Storck | June 1, 1948 |
| 2,532,266 | Andres | Nov. 28, 1950 |